2,754,214
PECTINIC ACID PRODUCT AND METHOD OF MAKING THE SAME

Herbert Thal Leo and Clarence C. Taylor, Anaheim, Calif.

No Drawing. Application November 24, 1953,
Serial No. 394,212

8 Claims. (Cl. 99—132)

This invention relates to a low ester pectinic acid product and to a method of making the same. More particularly the invention relates to the production from citrus peel of a dry finely divided admixture of a low ester pectinic acid and of substantially colorless particles of hemi-cellulose. Such an admixture can be made up into a relatively thick, cream-like aqueous dispersion, suitable for use as a stabilizer for ice cream, sherbets and the like. Also, because of the demethylated nature of the pectinic acid in our composition, the composition can be used to form a calcium pectinate type jelly with food products such as milk and the various forms of milk such as concentrated or dehydrated milk, that are suitable for furnishing calcium ions.

Thus, the same composition serves many purposes because functioning differently in different admixtures. The composition sets up into a jell when brought to the proper acid pH in the absence of calcium ions, and forms a calcium jell under other pH conditions when calcium ions are present. The incorporation of a calcium sequestering agent into the composition lessens its sensitivity toward calcium ions so as to enable the composition to function in both of these manners. The presence of the hydrophilic fibrous particles of hemi-cellulose assists the thickening and stabilizing function of the composition. This is due to the strongly absorptive properties of the fibers toward water, causing the fibers to take up large proportions of water and to swell up correspondingly.

It had heretofore been proposed by one of us in the H. T. Leo Patent No. 1,513,615, to treat fruit pulp in the absence of acids with a separately derived enzyme, pectase, and by precipitation with alcohol, recover a "pectous" product. Such a product would now be known to be a demethylated pectin, or a pectinic acid, probably in the form of its insoluble calcium salt, due to the fact that calcium carbonate was used to neutralize any acid present and to the fact that in the subsequent treatment with alcohol multivalent ions, such as calcium, would be precipitated out as in organic salts, along with the "calcium pectate." Thus, the product of Patent No. 1,513,615 would be in a very impure state and would be impossible of use in the manner intended for the product of our present invention.

Another patent seemingly having a bearing upon the present invention is the patent to Leo et al. No. 1,838,949. In the method of that patent, citrus peel is digested with acid at a pH of 1.23 to solubilize the pectin present in the peel, and then the resulting mass is partially buffered to prevent further destruction of the pectin. The mass is screened to remove seeds and undigested fibers, and the screened mass run through an homogenizer. If a dry product is desired, the pectin and digested fibers are precipitated and dried. While the resulting product comprises pectin and hemi-cellulose in admixture with each other, the pectin is a high methoxyl pectin and therefore not calcium-reactive.

In accordance with our present method, a demethylated pectin, or a low ester pectinic acid, is produced, which is, accordingly, calcium reactive and can be used in the making of calcium-type jellies, custards and the like. Additionally, as previously stated, if a calcium sequestering agent, such as sodium hexametaphosphate is added to the demethylated pectin-hemicellulose product of our method, the product is sufficiently acid-reactive to be capable of making a jell, in the absence of multivalent ions, merely by adjusting the pH to the proper degree of acidity.

Our present method involves the enzymic action of pectase upon citrus peel with which the enzyme is normally associated. The peel, after removal of the juice, seeds and essential oils, is washed under pH conditions such as to avoid the loss of pectase while removing water soluble constituents. After washing, the peel is placed in an environment favorable to enzymic action and the pectin in the peel is demethylated in situ. Thereafter multivalent ions (calcium and magnesium, principally) are eliminated by washing with strongly acidified aqueous alcohol, followed by nearly 100% unacidified alcohol for removal of any color and any remaining oils. The final product is approximately a 50/50 mixture of demethylated pectin and hemicellulose substantially free of color, odor, enzymes and multivalent ions and having a pH of between 3.50 and 4.00.

It is therefore an object of this invention to provide a low ester pectinic acid composition consisting essentially of an intimate mixture of demethylated pectin and hemi-cellulose substantially free of color, odor, enzymes and multivalent ions, and consequently capable of forming either an acid type jell in the absence of multivalent ions, or of forming a calcium-type jell in the presence of multivalent ions.

Another important object of this invention is provide an inexpensive method of producing the aforesaid composition that eliminates steps employed in the methods commonly used for isolating pectin and that leaves the demethylated pectin and hemicellulose in intimate association with each other.

It is a further important object of this invention to provide a method of producing a substantially colorless and odorless demethylated pectin-hemicellulose composition wherein not only is the step of separating pectin from hemicellulose eliminated but the inclusion of the hemi-cellulose in the final product is turned to advantage where the hydrophilic properties of the hemicellulose are utilized for their resulting thickening or stabilizing action toward ice-cream and sherbet mixes, or for their emulsifying action toward fats and oils.

Other and further important objects of this invention will become apparent from the following description and appended claims.

In the method of our invention, we start with citrus fruit, which includes lemons, grapefruit, oranges, tangerines and limes. Lemons are the preferred source of pectin for our purposes. The process will therefore be described in connection with lemons, but it will be understood as applicable to other citrus fruit.

The lemons are first cut in two and the halves reamed to remove juice and seeds. After being macerated to remove essential oils, the peel is cut into small pieces, or sliced, and washed with water to remove as much of the water solubles—salts, acids and the like—as possible.

In washing the peel, the pH of the mass is adjusted by the addition of acid, if necessary, to keep the pH at not over 4.0 so as to avoid dissolving the enzyme pectase and yet not so low as to dissolve any of the pectin, or protopectin, to any appreciable extent. A pH of between 3.5 and 4.0 has been found satisfactory for our purposes.

After being washed, the peel is placed in a tank with a salt, preferably sodium chloride, at a concentration of about 0.25 mol per liter. Other salts, such as sodium acetate, may be used but sodium chloride is the cheapest and most available for use as an activator for the enzyme pectase. A sufficient amount of an alkaline reacting alkali metal or ammonium salt, such as sodium bicarbonate, trisodium phosphate, and the potassium or ammonium corresponding salts, is added to impart to the mass a pH of from 5.80 to 7.00. The preferred pH for maximum enzymic activity is about 6.50, and a pH of 7 should not be exceeded because of possible degrading effect on the pectin.

During this period of enzymic activity, the enzyme pectase goes into solution and acts upon the pectin, or protopectin, to convert the same in situ in the peel into a low ester pectinic acid, also herein referred to as demethylated pectin. Actually the enzymic action stops short of complete demethylation of the pectin. The time of the enzymic action is from 1 to 3 hours, during which substantially all of the enzyme present is brought into solution in the salt solution and extracted from the peel. The latter becomes very firm and tough, due probably to calcium and magnesium ions present in the peel and in the water. The enzymic reaction has been found to be complete when carried out at room temperature (20° C., or 68° F.) for three hours, for oranges, grapefruit, limes and tangerines, as well as for lemons.

The water suspension of peel is pumped through a revolving reel (screen) to remove excess water and all therein dissolved substances such as salts and enzymes. The peel may optionally be further washed, drained or even pressed to remove a maximum of water solubles.

The treated peel, containing low ester pectinic acid as an integral part of the peel, is then washed with an aqueous alcohol solution acidified to a pH of around 1. An acid capable of forming soluble calcium and magnesium salts, such as hydrochloric acid, is preferred. The alcohol used may be ethyl or isopropyl alcohol. Alternatively, but not so satisfactorily, acetone can be used. The acidified aqueous alcohol should be between 60 and 80% by volume to insure ionization of the acid and solvent action toward multivalent metal salts. The washing with the acidified aqueous alcohol is continued until all, or substantially all of the iron, calcium, magnesium and other multivalent metallic ions have been removed from the peel. This requires about one hour at room temperature.

After this period, the peel is washed with fresh 70% alcohol until the pH is above 2.50. At this stage an alkaline aqueous alcohol solution is added to partially neutralize the acidity of the mass and preferably bring it to pH between 3.50 and 4.00. Ammonia is the preferred alkali for this purpose, but other alkaline substances, such as sodium lactate, or ammonia and sodium lactate may be added to the alcohol used in washing the peel.

Finally the peel is washed with 100% alcohol and the washing continued until the alcohol associated with the peel is substantially 100% strength. Isopropyl alcohol is the preferred alcohol for use throughout our process. The nearly 100% alcohol washing is continued until it has removed substantially all of the color and also any oil soluble constituents of the peel that produce or tend to develop a disagreeable flavor or odor in the final product.

The alcohol washed product is screened, pressed and vacuum dried to a low moisture content to give, in the case of lemon peel, an approximately 50/50 admixture of demethylated pectin and hemicellulose. The dried product is ground to 60 mesh (standard U. S. screen). In the resulting finely divided product, the demethylated pectin and the hemicellulose are intimately associated and probably form an integral part of each individual particle in the dry mixture. Depending upon the relative humidity of the ambient air, the moisture content of the powdered demethylated pectin-hemicellulose product will vary somewhat, but will, in general, be about 5% by weight.

The low ester pectinic acid of our product is insoluble in any aqueous medium having a pH of less than 4 but is readily dissolved when the aqueous medium has a pH of between 4 and 7 and is free from multivalent cations.

The following test has been found satisfactory for indicating the completion of enzymic activity in the production of our demethylated pectin-hemicellulose product.

TEST FOR CALCIUM SUSCEPTIBILITY

One (1) quart of distilled water is heated to near the boiling point and ½ oz. of the product as 60 mesh dried peel is stirred into the water. Mixing is continued in a Waring Blendor until a dispersion having a smooth, uniform consistency is obtained. The pH will be between 3.50 and 3.70 if neutralization has been carried out as described above.

A solution of sodium hexametaphosphate is used to test the product so dispersed. Preferably we use an adjusted Calgon (sodium hexametaphosphate) that is available on the market for household use packed in 1 lb. 3 oz. packages with aluminum foil wrap. When the contents of this package are dissolved in ½ gallon of tap water, a considerable evolution of $CO_2$ takes place. When the Calgon is completely in solution, the pH is 7.00 or slightly above, sometimes as high as 8.00. After two or three days' standing the solution should be filtered through a canton flannel cloth to remove any sediment.

While the foregoing procedure for making up the Calgon test solution is preferred a satisfactory solution can be prepared with unadjusted Calgon to which is added sufficient sodium carbonate, dissolved in a 25% solution, to raise the pH from about 5.2 to 7 to 8.

Now add 25 cc. of the preferred Calgon test solution to the quart of the product to be tested. The pH of the resulting dispersion of low ester pectinic acid and hemicellulose will rise to 5.80 to 6.20.

SNAKE TEST

A custard or similar, dish is filled one-half full with the Calgon treated dispersion. A 25% solution of calcium chloride ($CaCl_2$) is poured down the inside surface of the dish until about one-half the volume of the dispersion has been added. The $CaCl_2$ solution being denser will form a layer under the dispersion. Now insert a fork into the lower $CaCl_2$ layer and start withdrawing the fork slowly with the semi-solid ribbon or string that should adhere to it if the enzymic action has gone to completion. With a little practice, the operator can lift out of the dish a long "snake" of the calcium pectinate that is formed by the reaction between $CaCl_2$ and the demethylated pectin. The material should be relatively firm and have enough cohesion to produce the "snake." If it does not the enzymic action has not been carried to completion.

If the snake forms readily as described the enzyme reaction has progressed to the desired end point for our purposes.

The following examples will serve to indicate the varied uses for our product.

Example 1.—Custard dessert

A large can of evaporated milk is emptied into a kettle and sufficient water added to the milk to make up to a pint. ¼ cup of cane sugar and 1 tsp. of vanilla extract are added and the whole is heated to 180° to 200° F. 1 cup (8 fl. oz.) of our demethylated pectin-hemicellulose dispersion with Calgon added (as described above) is then added to the contents of the kettle. After mixing well, the contents of the kettle are poured into custard dishes and allowed to cool. Upon cooling the product sets to a good quality custard-like dessert.

In the making of milk custards the calcium of the milk reacts with the demethylated pectin to form a calcium pectinate having a custard-like texture and consistency.

Example 2.—Jell or topping

Frozen berries or other fruit are used. If frozen a 10 or 12 oz. package of the frozen fruit is first thawed and then 1 to 2 oz. of lemon juice are added to improve the taste and also to put the fruit definitely on the acid side (about 4 or less pH preferably 3.5 to 4).

1 cup of sugar and ½ cup of water are mixed in a kettle and warmed to near a scalding temperature. Into this syrup is stirred 1 cup of the Calgon treated dispersion of our demethylated pectin-hemicellulose product. The resulting mass is thoroughly mixed but not heated further.

The thawed fruit-lemon juice mixture is then stirred into the hot mass in the kettle. Upon being poured into jars or glasses the resulting mass will set up quickly into a jell.

The jell formation in this case is due to the reaction of the acid (lemon and/or fruit juice) upon the low ester pectinic acid, with the result that free pectinic acid is thrown out of solution as a jell.

Below a pH of about 4.0 the low ester pectinic acid is forced out of solution and, being of a colloidal nature forms a jelly.

Example 3.—Stabilizer for ice creams and sherbets

A stabilizer for ice cream and sherbets is prepared as follows:

Equal portions by weight of our demethylated pectin-hemicellulose mixture (60 mesh) and of gelatin (40 to 60 mesh) are mixed together to form a dry stabilizer mix. To 1 gallon of hot water are added 6.4 oz. of the resulting dry stabilizer mix, and 6.4 oz. of 25% Calgon solution are added to impart to the resulting liquid stabilizer mix a pH of between 6.0 and 6.5. This will be hereinafter referred to as our liquid stabilizer mix. It is of a thick, creamy consistency.

Example 4.—Ice cream

The following is a typical ice cream formula:

10% fat
12% serum solids
15% sugar (cane)
0.4% stabilizer 37.4% total solids 1 gallon of our liquid stabilizer mix prepared as in Example 3, is the equivalent of the 0.4% stabilizer in above formula for a 100 lb. batch on the above total solids basis.

In preparing a 100 lb. batch, the following are mixed together:

Mix 19.2 lbs. of 40% cream
43.4 lbs. of 4% milk
8.0 lbs. of evaporated milk (2/1 concentration)
8.4 lbs. of stabilizer (1 gallon of our liquid stabilizer mix)
15.0 lbs. of sugar
6.0 lbs. of nonfat dry milk solids (NDMS)

100.0 lbs. MIX

*Procedure.*—The N. D. M. S. is dissolved in a mixture of the milk and evaporated milk. The cream and sugar are added and the mass heated to 160° F. to pasteurize the same. The one-gallon of our liquid stabilizer mix heated to about 150 to 160° F., is then added and the whole mass is homogenized, cooled and aged before freezing.

In ice cream, our stabilizer mix functions from several standpoints. The demethylated pectin being calcium reactive, responds the same as in the making of custards. Due to the homogenizing of the mix the hemicellulose has increased water absorptivity to impart velvety "dry" texture to the ice cream. The gelatin is for the usual purpose of giving an over-run. The gelatin can be added separately instead of being incorporated in our stabilizer mix. For ice cream the over-run seldom exceeds 100% while in sherbet the limit is usually 50%.

Example 5.—Sherbet

In making a sherbet, 7 oz. of our dry stabilizer mix are used for each 100 lbs. of sherbet base. The 7 oz. of stabilizer are stirred into 1 gallon of hot water and 3 fl. oz. of 25% Calgon solution are added or enough to give the resulting liquid mix a pH at least as high as 5.2 but not above 6.0.

*Procedure.*—33¼ lbs. of water are added to a mixer followed by 20 lbs. of sucrose and 8 lbs. of dextrose. 10 lbs. of ice cream mix (such as that in Example 4) are added. The liquid stabilizer mix, prepared as above is then stirred in. This makes 80 lbs. of (A) mixture.

5 qts. of strained orange juice, 1 qt. of lemon juice and enough 50% citric acid solution to give an acidity of 0.35% (calculated as citric acid), plus color and flavor are mixed with sufficient water to make 20 lbs. of (B) mixture. The desired pH in the final sherbet should be about 3.50 (but in any event below 4.00).

(A) mixture is subjected to freezing conditions and when partially frozen, (B) mixture is added and freezing continued. Homogenizing (A) mixture first will give a much smoother, finer sherbet. (A) mixture is heated to 160° F. homogenized, cooled and aged and then subjected to partial freezing and mixed with (B) mixture.

To the best of our knowledge the demethylated pectin hemicellulose product of our invention is the first product in which the demethylated pectin or pectinic acid, is left in the fiber (the hemi-cellulose) as an intimate or integral part thereof to provide a product that is free from color, odor or other objectionable property from the standpoint of human consumption. Thus our product is the first of this type to be a commercially satisfactory one.

We claim as our invention:

1. The method of making a low ester pectinic acid product which comprises separating citrus peel from juice and seeds, comminuting said peel, washing said peel with water at a pH below 4 but above that at which appreciable dissolution of pectic substances present in the peel will take place, adjusting said washed peel to a pH suitable for the action of the enzyme pectase present in said peel, continuing such enzymic activity until the pectic substances in said peel have been largely converted in situ into a low ester pectinic acid, washing said resulting peel under conditions such as to remove substantially all multivalent metallic cations without dissolving said pectinic acid, and washing said peel with a solvent for coloring matter present in said peel but not for the pectinic acid to leave a substantially colorless low ester pectinic acid-hemicellulose product.

2. The method of making a low ester pectinic acid product, which comprises separating citrus peel from juice and seeds, comminuting said peel, washing said peel with water at a pH below 4 but above that at which appreciable dissolution of pectic substances present in the peel will take place, adjusting said washed peel to a pH suitable for the action of the enzyme pectase present in said peel, continuing such enzymic activity until the pectic substances in said peel have been largely converted in situ into a low ester pectinic acid, washing said resulting peel under conditions such as to remove substantially all multivalent metallic cations without dissolving said pectinic acid, washing said peel with a solvent for coloring matter present in said peel but not for the pectinic acid to leave a substantially colorless low ester pectinic acid-hemicellulose product, and forming said product into a well blended thick creamy suspension having a pH of between 6.0 and 6.5 in the presence of solubilizing agents for the pectinic acid.

3. The method of making a low ester pectinic acid product, which comprises separating citrus peel from juice and seeds, comminuating said peel, washing said peel with water at a pH below 4 but above that at which appreciable dissolution of pectic substances present in the peel will take place, adjusting said washed peel to a pH suitable for the action of the enzyme pectase present in said peel, continuing such enzymic activity until the pectic substances in said peel have been largely converted in situ into a low ester pectinic acid, washing said resulting peel with an acidified aqueous alcohol to remove substantially all polyvalent metallic cations without dissolving said pectinic acid, washing said peel with substantially full strength alcohol to remove coloring matter present in said peel and to leave a substantially colorless low ester pectinic acid-hemicellulose product, and mixing said product in an aqueous medium with sodium hexametaphosphate to produce a liquid stabilizing mix having a pH of between 6.0 and 6.5.

4. The method of making a low ester pectinic acid product, which comprises separating citrus peel from juice and seeds, comminuting said peel, washing said peel with water at a pH below 4 but above that at which appreciable dissolution of pectice substances present in the peel will take place, adjusting said washed peel to a pH suitable for the action of the enzyme pectase present in said peel, continuing such enzymic activity until the pectic substances in said peel have been largely converted in situ into a low ester pectinic acid, washing said resulting peel with an acidified aqueous alcohol solution such as to remove substantially all multivalent metallic cations without dissolving said pectinic acid, washing said peel with an alcohol of nearly 100% strength to remove coloring matter present in said peel and to leave a substantially colorless low ester pectinic acid-hemicellulose product, in which the pectinic acid is in a non-dissolved state integrally admixed with the hemi-cellulose, and grinding said product to a finely divided powder, free from objectionable color or odor.

5. The method of making a low ester pectinic acid product which comprises separating citrus peel from juice and seeds, comminuting said peel, washing said peel with water at a pH below 4 but above that at which appreciable dissolution of pectic substances present in the peel will take place, adjusting said washed peel to a pH suitable for the action of the enzyme pectase present in said peel, continuing such enzymic activity until the pectic substances in said peel have been largely converted in situ into a low ester pectinic acid, washing said resulting peel with an acidified aqueous alcohol solution so as to remove substantially all multivalent metallic cations and then with an alkaline aqueous alcohol but without dissolving said pectinic acid, washing said peel with an alcohol of substantially 100% strength to remove coloring matter and any oil present in said peel and to leave a substantially colorless low ester pectinic acid-hemicellulose product, in which the pectinic acid is in a non-dissolved state integrally admixed with the hemicellulose but is soluble in an aqueous solution free from multivalent metallic cations and having pH of from 4 to 7.

6. The method of making a low ester pectinic acid product having stabilizing, thickening and jelly-making properties, which comprises separating citrus peel from juice and seeds, comminuting said peel, washing said peel with water at a pH not over 4.0 to remove substantial amounts of water soluble constituents without substantial removal of enzymes present therein, adding said washed peel to water containing salt in solution and having a pH of from about 5.8 to 7 to initiate enzymic action by the enzyme pectase left in said peel, causing said enzymic action to continue until the pectic substances in said peel have been largely converted in situ into a low ester pectinic acid, washing said resulting peel first with an aqueous acidified alcohol solution having a pH of about 1 to remove multivalent metal cations, next with an alkaline aqueous alcohol solution to bring the pH to between 3.5 and 4.0 and then with substantially 100% isopropyl alcohol to remove practically all coloring matter and oil present and leave a substantially colorless product containing the pectinic acid in situ in admixture with hemicellulose, drying said product, and grinding the same to a finely divided powder, the pectinic acid content of which is soluble in the absence of multivalent metallic ions in an aqueous solution having a pH of between 4 and 7 and is insoluble in an aqueous medium having a pH below 4.

7. As a new composition of matter produced from citrus fruit, a finely divided powder comprising a low ester pectinic acid and hemicellulose in intimate admixture, substantially free from color, odor or enzymes, the pectinic acid content being soluble in the absence of multivalent metallic ions in an aqueous solution having a pH of between 4 and 7 and being insoluble in an aqueous medium having a pH below 4.

8. As a new composition of matter a thick, creamy aqueous dispersion of a demethylated low ester pectinic acid and of a citrus peel hemicellulose substantially free from color and oil and in a fine state of subdivision, said dispersion having a pH between 4 and 7, being substantially free from multivalent metallic cations and containing sodium hexametaphosphate adapting said dispersion for use in jelly making by an acid reaction and for use in making calcium type custards by reaction with multivalent metallic cations, the pectinic acid being in solution in said aqueous dispersion.

References Cited in the file of this patent

UNITED STATES PATENTS

| | | |
|---|---|---|
| 1,513,615 | Leo | Oct. 28, 1924 |
| 1,838,949 | Leo et al. | Dec. 29, 1931 |
| 1,976,741 | Mithoff | Oct. 16, 1934 |
| 2,207,299 | Mnookin | July 9, 1940 |
| 2,358,430 | Willaman et al. | Sept. 19, 1944 |
| 2,483,549 | Leo et al. | Oct. 4, 1949 |